(12) United States Patent
King et al.

(10) Patent No.: US 7,683,321 B1
(45) Date of Patent: Mar. 23, 2010

(54) SHUTTERLESS INFRARED IMAGER ALGORITHM WITH DRIFT CORRECTION

(75) Inventors: Stephen R. King, Santa Cruz, CA (US); Mathew N. Rekow, Santa Cruz, CA (US); Paul S. Carlson, Santa Cruz, CA (US)

(73) Assignee: Fluke Corporation, Everett, WA (US)

( * ) Notice: Subject to any disclaimer, the term of this patent is extended or adjusted under 35 U.S.C. 154(b) by 0 days.

(21) Appl. No.: 12/339,434

(22) Filed: Dec. 19, 2008

(51) Int. Cl.
*G01J 5/00* (2006.01)
(52) U.S. Cl. .................................. 250/332; 250/252.1
(58) Field of Classification Search .............. 250/252.1, 250/330, 332, 338.1
See application file for complete search history.

(56) References Cited

U.S. PATENT DOCUMENTS

| | | | |
|---|---|---|---|
| 6,515,285 B1 * | 2/2003 | Marshall et al. ............. | 250/352 |
| 6,730,909 B2 * | 5/2004 | Butler ...................... | 250/338.1 |
| 6,879,923 B2 * | 4/2005 | Butler ........................ | 702/104 |
| 7,030,378 B2 * | 4/2006 | Allen et al. .................. | 250/332 |
| 7,122,788 B1 * | 10/2006 | Owen et al. ............... | 250/252.1 |
| 2001/0045516 A1 * | 11/2001 | Emanuel et al. ............. | 250/332 |
| 2002/0074499 A1 * | 6/2002 | Butler ...................... | 250/338.1 |
| 2005/0029453 A1 * | 2/2005 | Allen et al. .................. | 250/332 |
| 2006/0279632 A1 | 12/2006 | Anderson | |
| 2008/0099683 A1 | 5/2008 | Schmidt et al. | |
| 2008/0210872 A1 * | 9/2008 | Grimberg .............. | 250/339.04 |
| 2008/0302956 A1 | 12/2008 | Anderson | |

OTHER PUBLICATIONS

Sheard, Justin et al., U.S. Appl. No. 12/196,136, filed Aug. 21, 2008.

* cited by examiner

*Primary Examiner*—David P Porta
*Assistant Examiner*—Mark R Gaworecki
(74) *Attorney, Agent, or Firm*—Fredrikson & Byron, P.A.

(57) ABSTRACT

An infrared imaging system having functionality for maintaining image quality in the presence of temperature drift of the system. Such functionality is applied repetitively to maintain image quality of a target scene, yet without continuous actuation of a shutter of the system. The functionality of the imaging system results from implementing an imager algorithm. In use, the imager algorithm functions with a calibration curve created for the imaging system, with the curve comprising a plot of system output versus target scene temperature.

28 Claims, 7 Drawing Sheets

SHUTTERLESS INFRARED IMAGER ALGORITHM WITH DRIFT CORRECTION

TECHNICAL FIELD

Embodiments of the present invention pertain to infrared imaging systems and, more particularly, to such systems using an imager algorithm to limit shutter actuations of the systems without sacrificing image quality.

BACKGROUND

As is known, infrared cameras generally employ a lens working with a corresponding infrared focal plane array (FPA) to provide an image of a view in a particular axis. The operation of such cameras is generally as follows. Infrared energy is accepted via infrared optics, including the lens, and directed onto the FPA of microbolometer infrared detector elements. Each detector element responds to the heat energy received by changing its resistance value. An infrared (or thermal) image can be formed by measuring the detector elements' resistances—via applying a voltage to the detector elements and measuring the resulting currents or applying current to the detector elements and measuring the resulting voltages. A frame of image data may, for example, be generated by scanning all the rows and columns of the FPA. A dynamic thermal image (i.e., a video representation) can be generated by repeatedly scanning the FPA to form successive frames of data, with such frames being produced at a rate sufficient to generate a video representation of the thermal image data.

Individual detector elements have unique response characteristics. These response characteristics are found to produce non-uniformities, which often result in fixed pattern noise. Many infrared cameras have functionality to correct for such noise. For example, some infrared cameras can automatically or manually perform offset compensation, which corrects for variations in the individual detector element responses by observing a uniform thermal scene (e.g., by placing a shutter between the optics and the array) and measuring offset correction data for each detector element which provides the desired uniform output response. These measured offset corrections are stored, then later applied in subsequent infrared measurements (e.g., with the shutter open) to correct for fixed pattern noise. Other compensations can also be applied, such as 2-point correction.

As is known, offset compensation functionality is found in most conventional infrared cameras because it leads to improved imaging capabilities. However, offset compensation can be an inconvenience to the user as it necessitates activation of the camera shutter, thereby "freezing" the camera image for a short period of time when the shutter is closed. Therefore, it is desirable to keep the period between offset compensations lengthy so as to limit the general inconvenience to the user of the camera, while still maintaining good image quality.

Temperature changes within or surrounding an infrared camera can be further found to result in the individual detector elements exhibiting their unique response characteristics. In particular, the change in temperature of the camera's internal components, e.g., due to self-heating or as the result of changes to the surrounding ambient temperature, leads to the individual detector elements exhibiting fixed pattern noise over extended lengths of time. For example, during initial powering of an infrared camera, the internal components can be found to continue to rise in temperature for a period of time before the camera becomes thermally stable. Because of this, offset compensation is often performed at an increased frequency during such period so as to maintain good image quality from the camera. Such increased frequency of offset compensation correspondingly results in an increased frequency of shutter actuation. Consequently, there is further inconvenience for the user as the shutter is closed more often during such period.

What are needed are apparatus and systematic methods to address or overcome one or more of the limitations briefly described above with respect to offset compensation functionality in infrared imaging systems.

SUMMARY

Embodiments of the invention involve an infrared imaging system having functionality for maintaining image quality in the presence of temperature drift of the system. The functionality is applied repetitively to maintain image quality of a target scene, yet without continuous actuation of a shutter of the system. The functionality of the imaging system results from implementing an imager algorithm. In use, the imager algorithm functions with a calibration curve created for the imaging system, with the curve comprising a plot of system output versus target scene temperature.

In certain embodiments, the imaging system includes a focal plane array (FPA); an enclosure disposed over the FPA, yet allowing for infrared energy from a target scene to be directed onto the FPA; and a shutter that can be selectively actuated so as to block infrared energy emanating from the target scene from reaching the FPA. When the imaging system is used in the field to view a target scene, the shutter of the system is initially closed to ascertain a base output for the detector elements of the FPA. Used in conjunction with the calibration curve and real-time measurements from the imaging system, the base output serves as a reference measurement in calculating the output of the FPA detector elements attributable to the target scene on an ongoing basis without necessitating further actuation of the shutter.

BRIEF DESCRIPTION OF THE DRAWINGS

The following drawings are illustrative of particular embodiments of the present invention and therefore do not limit the scope of the invention. The drawings are not to scale (unless so stated) and are intended for use in conjunction with the explanations in the following detailed description. Embodiments of the present invention will hereinafter be described in conjunction with the appended drawings, wherein like numerals denote like elements.

DETAILED DESCRIPTION

The following detailed description is exemplary in nature and is not intended to limit the scope, applicability, or configuration of the invention in any way. Rather, the following description provides practical illustrations for implementing exemplary embodiments of the present invention. In the foregoing detailed description, the invention has been described with reference to specific embodiments. However, it may be appreciated that various modifications and changes can be made without departing from the scope of the invention as set forth in the appended claims.

As described above, infrared imaging systems are typically configured to perform offset compensation by actuating or closing a shutter thereof to reset offsets for detector elements of a focal plan array (FPA) based on the current temperature of the shutter. In turn, such offsets are used to correct non-uniformities from the individual detector elements of the FPA. However, one limitation to this compensation technique is the high frequency of shutter actuation that is warranted, particularly when ambient temperature surrounding the imaging systems varies or the internal components of the imaging systems are found to exhibit thermal change. As described above, high frequency of shutter actuation can inconvenience the user as the image provided by the infrared imaging system is often frozen for a short period of time when the shutter is closed. As alluded to above, embodiments of the invention are provided to eliminate the need to actuate a shutter during periods of continued use of the imaging system.

Figure 1:
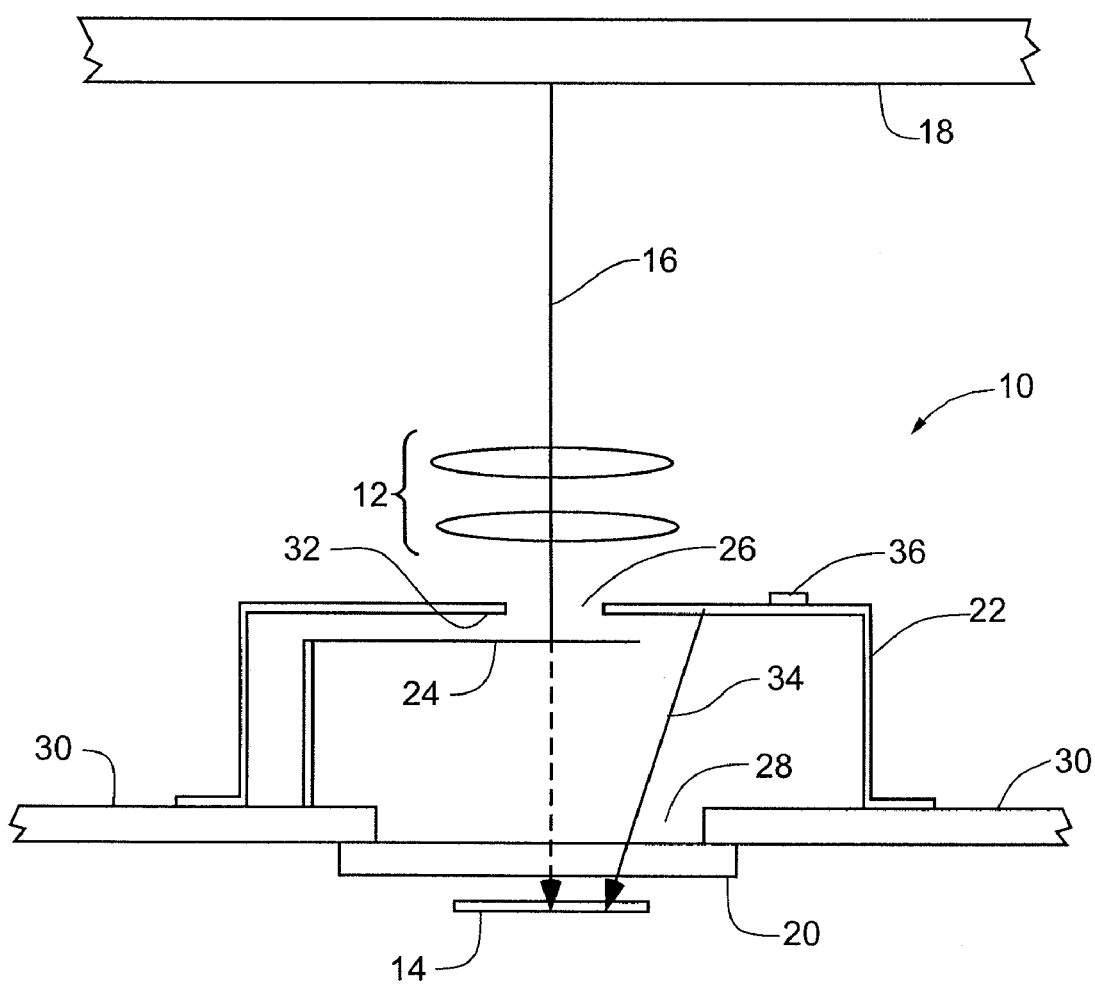
FIG. 1 is a representative cross-sectional top view of part of an exemplary infrared imaging system in accordance with certain embodiments of the invention.

FIG. 1 shows a representative cross-sectional top view of part of an exemplary infrared imaging system 10 in accordance with certain embodiments of the invention. As illustrated, such system 10 includes optics 12 (e.g., one or more lenses) and an infrared focal plane array (FPA) 14. As described above, in operation, the system 10 receives image information in the form of infrared energy 16 through the optics 12 from a source 18 (e.g., a target scene). In turn, the optics 12 direct the infrared energy 16 through a FPA window 20, and onto the FPA 14.

As is generally understood, the FPA 14 can include a plurality of infrared detector elements (not shown), e.g., including bolometers, photon detectors, or other suitable infrared detectors well known in the art, arranged in a grid pattern (e.g., an array of detector elements arranged in horizontal rows and vertical columns). The size of the array can be provided as desired. For example, an array of 160×120 detector elements can be employed, but the invention should not be limited to such. Further detailed description of an FPA and its functioning can be found in patent application Ser. No. 11/553,373, entitled "Multiple View Infrared Imaging System", the disclosure of which is incorporated by reference herein in relevant part.

While not shown, one or more electrical circuits (not shown) are provided downstream from the FPA 14 to create an image based on the image view captured by the optics 12 and the corresponding infrared energy 16 projected onto the detector elements of the FPA 14. Further detailed description of such electrical circuits and their functioning can be found in patent application Ser. No. 12/054,818, entitled "Offset Compensation Scheduling Algorithm for Infrared Cameras," the disclosure of which is incorporated by reference herein in relevant part.

Further included in the system 10, and generally disposed between the optics 12 and the FPA 14, are an enclosure 22 as well as a shutter 24. The enclosure 22, as shown in FIG. 1, is disposed over the FPA 14. In certain embodiments, the enclosure 22 and shutter 24 are separate components of the imaging system 10; however, the invention should not be limited to such. For example, while not shown as such, the shutter 24 may be formed as a portion of the enclosure 22, with the shutter 24 extending from the enclosure 22 and being movable between an open or closed position, as described below.

The enclosure 22 defines opposing apertures, a first or outer aperture 26 and a second or inner aperture 28. Each of the apertures 26, 28 are in alignment with the FPA 14 such that the infrared energy 16 from the source or target scene 18 can be directed through the apertures 26, 28 and onto the FPA 14. In certain embodiments, the infrared imaging system 10 can be a camera, and as shown, the enclosure 22 can be operatively coupled to an outer surface 30 of such camera so that the inner aperture 28 is located near the FPA 14, while the outer aperture 26 is located away from the FPA 14. In certain embodiments, the enclosure 22 can be formed of one or more isothermal materials, e.g., aluminum, so that its temperature is uniformly provided across its surfaces; however, the invention should not be limited to such. As further described below, the enclosure 22 can just as well be formed of one or more non-isothermal materials.

In certain embodiments, as shown in FIG. 1, the shutter 24 is located within the enclosure 22. As described above, the shutter 24 can be shifted in position. In a first or "closed" position, as illustrated in FIG. 1, the shutter 24 is situated so that it covers the outer aperture 26. Consequently, when in its closed position, the shutter 24 sufficiently blocks the infrared energy 16 emanating from the source 18 from reaching the FPA 14. Alternately, in a second or "open" position, the shutter 24 is situated so that it does not cover the outer aperture 26. For example, when in such open position, the shutter 24 may be disposed underneath or covered by an inner surface 32 of the enclosure 22. Accordingly, the infrared energy 16 emanating from the source 18 is allowed to pass through the outer aperture 26 and reach the FPA 14 (shown via dashed lines in FIG. 1). In certain embodiments, whether being in its closed or open position, the shutter 24 is in close proximity to the enclosure 22.

As should be appreciated, the detector elements of the FPA 14 are exposed to varied sources of infrared energy depending on whether the shutter 24 is in its closed position or its open position. In particular, when the shutter 24 is in its closed position, the detector elements of the FPA 14 are only exposed to infrared energy 34 emanating from the shutter 24 and the enclosure 22. Conversely, when the shutter 24 is in its open position, the detector elements of the FPA 14 are exposed to the infrared energy 16 emanating from the target scene 18 (via the outer and inner apertures 26, 28 of the enclosure 22), as well as the infrared energy 34 emanating from the enclosure 22 and the shutter 24. It should be appreciated that the thermal properties of the enclosure 22 and the shutter 24 are substantially similar in light of their close proximity and their similar compositions (e.g., both are generally formed of metal). When in its open position, the shutter 24 is found to lie adjacent to a corresponding surface portion of the enclosure 22. Accordingly, infrared energy 34 emanating from the enclosure 22 and the shutter 24 in its open position can be generally thought of as the energy emanating from the enclosure 22.

In general, by taking the output of the detector elements of the FPA 14 when the shutter 24 is in its closed position and subtracting such from the output of the detector elements of the FPA 14 when the shutter 24 is in its open position, one can selectively parse the output of the FPA 14 that is specifically associated with the target scene 18. As should be appreciated, such technique is well known and used in many conventional infrared cameras. However, as described above, such technique necessitates frequent actuating of the shutter or flag when camera temperature, e.g., either within or ambient thereto, fluctuates. To address this limitation, the infrared imaging system 10 of FIG. 1 functions with an imager algorithm in order to negate the need for frequent actuation of the shutter 24, as described herein.

Figure 2:
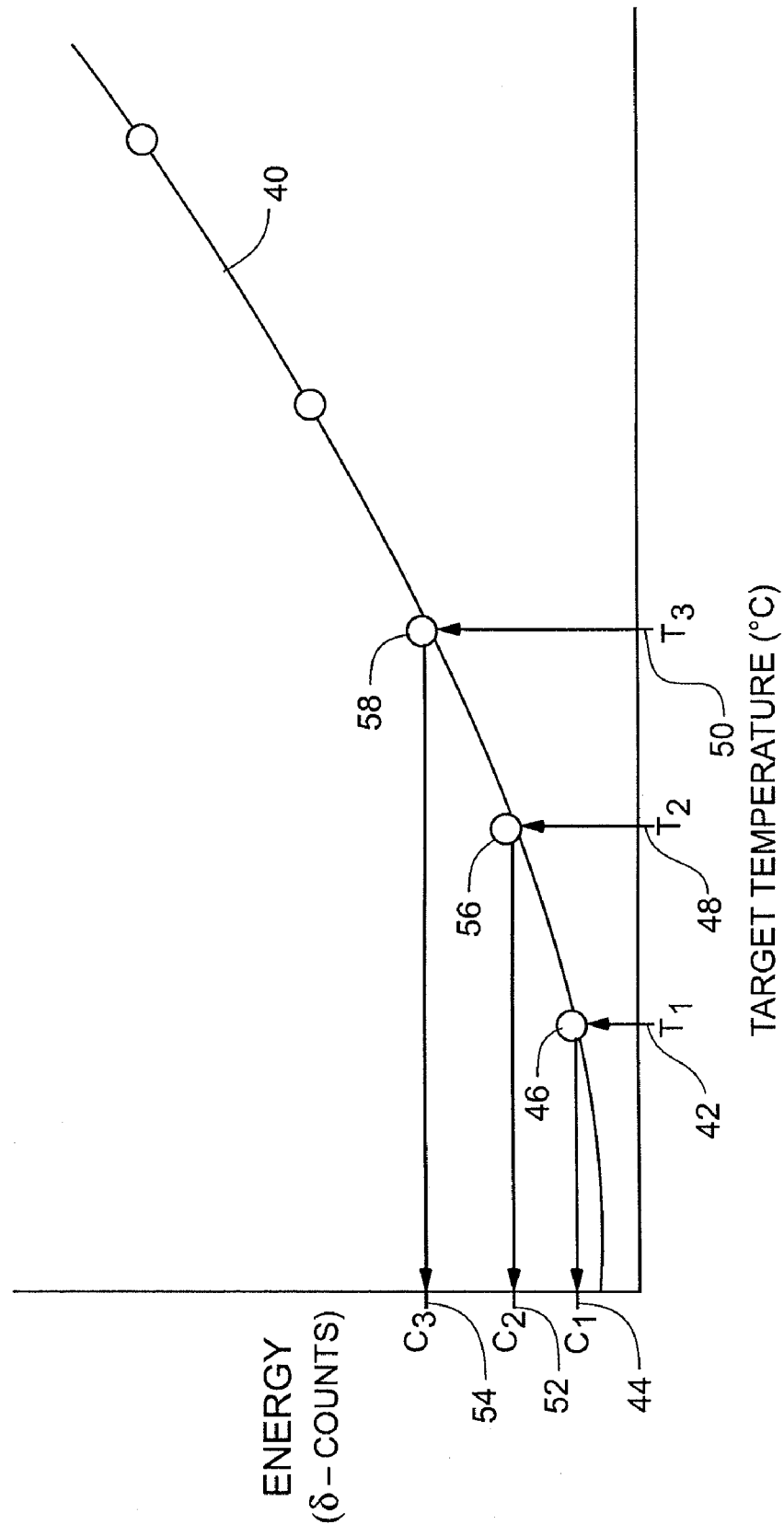
FIG. 2 is an exemplary plot of a calibration curve showing output of a reference detector element of the focal plane array (FPA) of the infrared imaging system of FIG. 1 for different temperatures of a target scene in accordance with certain embodiments of the invention.

FIG. 2 shows an exemplary plot of a calibration curve 40 showing output of a reference detector element of the FPA 14 of the infrared imaging system 10 of FIG. 1 for different temperatures of a target scene in accordance with certain embodiments of the invention. Such curve 40 is generally created following manufacture of the system 10, and is used in conjunction with the imager algorithm embodied herein. In certain embodiments, the reference detector element represents a plurality of detector elements of the FPA 14.

As alluded to above, the curve 40 is generated by calculating output of the reference detector element (e.g., δ-Counts) on the y-axis for different temperatures of a target scene (e.g., ° C.) on the x-axis. As shown, in certain embodiments, output of the reference detector element can be quantified as magnitude of counts. Such counts, in certain embodiments, can be provided from an output of an analog-to-digital converter (ADC). As briefly alluded to above, the outputs of the FPA detector elements are transmitted through one or more electrical circuits of the system 10, with the circuits configured to generate an image based on infrared energy from the view passing through the optics 12 and there from directed onto the FPA 14. In certain embodiments, the signals from the detector elements would be amplified and converted from an analog form to a digital form in the electrical circuits (e.g., using an ADC) so the intensities of the signals can be quantified in terms of counts. Generally, the quantity of digital counts measured corresponds to thermal intensity borne on the detector elements of the FPA 14.

In one example, the target scene temperature for $T_1$ (referenced as 42) may be 20° C. At this value of $T_1$, a corresponding output of the reference detector element can be measured from the system 10. In certain embodiments, when the reference detector element represents a plurality of detector elements of the FPA 14, the measured outputs of the plurality of elements are averaged together to arrive at a single output for the reference detector element. In certain embodiments, the corresponding output may be derived from more than one measurement. For example, at such $T_1$ value, measurements can be taken for the reference detector element both (i) when the shutter 24 is in its closed position and (ii) when the shutter 24 is in its open position. In turn, the corresponding reference detector element output, $C_1$ (referenced as 44), is calculated by taking the measured output in counts from (i) above and subtracting it from the measured output from (ii) above. Accordingly, the output for the reference detector element attributable to the target scene ($C_1$) is calculated relative to the target temperature at 20° C. ($T_1$), using the following equation:

$$C_1 = \delta\text{-Counts}_{(T1-20°\ C.)} = \text{Counts}_{(shutter\ open)} - \text{Counts}_{(shutter\ closed)}. \quad (i)$$

Using the $T_1$ and $C_1$ values, a corresponding point 46 can be plotted in generating the calibration curve 40. The same process can then be repeated for other temperature values of the target scene in generating the curve 40. That is, for other target scene temperature values, e.g., $T_2$ (referenced as 48) and $T_3$ (referenced as 50), corresponding outputs for the reference detector element can be calculated, e.g., $C_2$ (referenced as 52) and $C_3$ (referenced as 54), from which corresponding points, 56 and 58, can be further plotted in generating the curve 40.

With further reference to the curve 40 of FIG. 2, while the outputs of the FPA reference detector element (on the y-axis of the curve 40) are exemplified herein as being derived from more than one output measurement of the system 10, the invention should not be limited to such. Instead, the output could just as well be derived from a single output measurement, e.g., output of the reference detector element with the shutter 24 in its open position. As should be appreciated, while such change would likely uniformly impact the magnitudes of the output points (on the y-axis of the curve 40), the slope of the curve 40 would largely remain unchanged.

During generation of the calibration curve 40 of FIG. 2, the temperatures of the FPA 14 as well as of the enclosure 22 and shutter 24 are generally maintained at or near constant values. As a result, the calculated output of the reference detector element of the FPA 14 is controlled to be primarily reflective of the changes made to the target scene temperature. In certain embodiments, the temperature of the FPA 14 can be maintained through use of a TE stabilizer (not shown). Such TE stabilizer is well known in the art, and is often coupled to an FPA so as to monitor and maintain the temperature of the FPA at a certain desirable value.

As described above, the temperatures of the enclosure 22 and the shutter 24 are substantially similar in light of their close proximity and their similar compositions. Accordingly, in certain embodiments, as shown in FIG. 1, the temperature of the enclosure 22 and shutter 24 can be collectively monitored through a temperature sensor 36 operatively coupled to the enclosure 22. In certain embodiments, if the enclosure 22 is formed of one or more isothermal materials, a single temperature sensor is generally sufficient for monitoring the temperature of the enclosure 22. However, if the enclosure 22 is not formed of isothermal material(s), multiple temperature sensors can be alternatively used, e.g., with such sensors positioned around the enclosure 22. The temperatures of the enclosure 22 (and shutter 24) can be maintained by controlling the periods of use of the system 10 during the calibration process and by controlling the ambient temperature surrounding the system 10.

Generating the calibration curve 40 of FIG. 2 in the above manner or other like fashion enables one to obtain the response of the reference detector element of the FPA 14 for different target scene temperatures. In certain embodiments, the curve 40 can be stored in memory of the imaging system 10, e.g., memory of a processor of the electrical circuits (not shown) located downstream of the FPA 14. In turn, when the system 10 is subsequently used in the field, such curve 40 can be retrieved from the memory and used by the imager algorithm in calculating real-time temperatures of the target scene 18, as described below.

Figure 3:
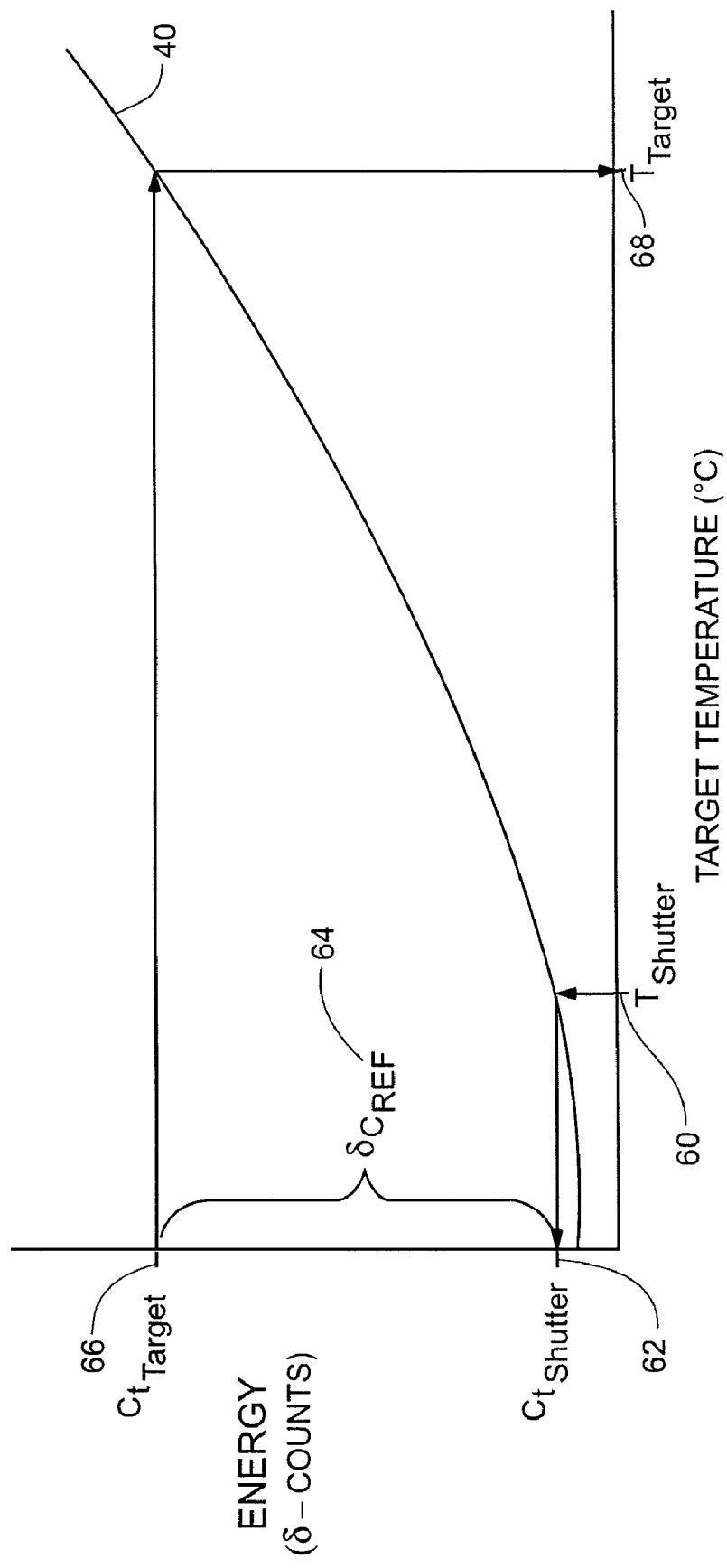
FIG. 3 is the calibration curve of FIG. 2 demonstrating how target scene temperature is calculated with reference to output of a reference detector element immediately after a shutter of the imaging system has been opened, in accordance with certain embodiments of the invention.

FIG. 3 shows the calibration curve 40 of FIG. 2 demonstrating how temperature of a target scene is calculated with reference to output of the reference detector element of the FPA 14 immediately after the shutter 24 has been opened, in accordance with certain embodiments of the invention. While FIG. 3 demonstrates such process for the FPA reference detector element, it should be appreciated that such process is contemporaneously performed for each individual detector element of the FPA 14 by the imager algorithm of the system 10, as is further described herein with respect to FIG. 4.

As described above, the calibration curve 40 of FIG. 2 enables one to obtain the response of the reference detector element of the FPA 14 for different target scene temperatures. However, one variable that needs to be accounted for in calculating the target scene temperature is how the enclosure 22/shutter 24 compare to their temperature when the curve 40 of FIG. 2 was generated. As described above, during calibration, the temperatures of such structures of the system 10 are generally maintained. However, when the system 10 is used in the field, the temperatures of these structures may likely vary. For any such variance, the outputs of the FPA detector elements need to be correspondingly compensated, in terms of their response, so that the curve 40 can be used in accurately calculating real-time target scene temperature. In certain embodiments, the temperature of such system structures is based on the temperature of the shutter 24.

As described above, the temperature of the shutter 24 ($T_{Shutter}$, referenced as 60) is generally reflective of the temperature of the enclosure 22, which in certain embodiments, as described above, can be retrieved from the temperature sensor 36 located on the enclosure 22. With regard to this example, such shutter temperature ($T_{Shutter}$) provides a reference temperature on the x-axis of the calibration curve 40, which is reflective of the temperatures of the system structures proximate to the FPA 14. In turn, the imager algorithm of the system 10 uses the curve 40 in determining a corresponding reference output of the reference detector element ($Ct_{Shutter}$, referenced as 62) for such shutter temperature ($T_{Shutter}$). As described above, such reference output of the reference detector element ($Ct_{Shutter}$) represents an offset in output of the reference detector element in light of the variance in temperature proximate to the FPA 14 from its generally maintained temperature during generation of the curve 40. In turn, as further described below, the reference output of the reference detector element ($Ct_{Shutter}$) is the point on the y-axis from which output of the reference detector element attributable to the target scene is projected. Accordingly, such reference output represents a reference offset for the system 10.

For example, the imager algorithm derives the output of the reference detector element attributable to the target scene 18 relative to its reference output ($Ct_{Shutter}$). With reference to FIG. 1, such derivation involves gathering the output of the reference detector element (e.g., in counts) with the shutter 24 in its closed position. As such, in certain embodiments, the reference detector element output with the shutter 24 in its closed position is initially measured (e.g., in counts), stored, and further retrieved from memory until the shutter 24 is closed again (as further detailed below). Accordingly, such stored output can be thought of as a base output of the reference detector element. The derivation further involves measuring the output of the reference detector element (e.g., in counts) immediately after the shutter 24 is moved to its open position. In turn, the output of the reference detector element attributable to the target scene is calculated by subtracting the stored output of the reference detector element with the shutter 24 closed from the output of the reference detector element with the shutter 24 open. In turn, this difference in output of the reference detector element ($\delta c_{Ref}$, referenced as 64) represents an output of the reference detector element attributable to the target scene.

Once the difference in output of the reference detector element ($\delta c_{Ref}$) is determined, the output of the reference detector element attributable to the target scene ($Ct_{Target}$, referenced as 66) can be obtained by adding such output of the reference detector element ($\delta c_{Ref}$) to its reference output ($Ct_{Shutter}$) and locating such combined output value on the y-axis. Subsequently, in using the calibration curve 40 with respect to the output of the reference detector element attributable to the target scene ($Ct_{Target}$), a corresponding target scene temperature ($T_{Target}$, referenced as 68) can be located on the x-axis.

The following equation represents the output relationship described above, with reference to FIG. 3:

$$Ct_{Target} = Ct_{Shutter} + \delta c_{Ref} \quad \text{(ii)}$$

From the above equation, it should be understood that $Ct_{Shutter}$ is used to compensate or offset the output of the reference detector element for a real-time temperature of the enclosure 22/shutter 24 as opposed to the temperature of such elements maintained during generation of the calibration curve 40. Accordingly, a reference or offset point is provided on the y-axis of the curve 40, from which output of the reference detector element attributable to the target scene ($\delta c_{Ref}$) is projected, with such output being derived relative to output measured during the most recent closure of the shutter 24.

Figure 4:
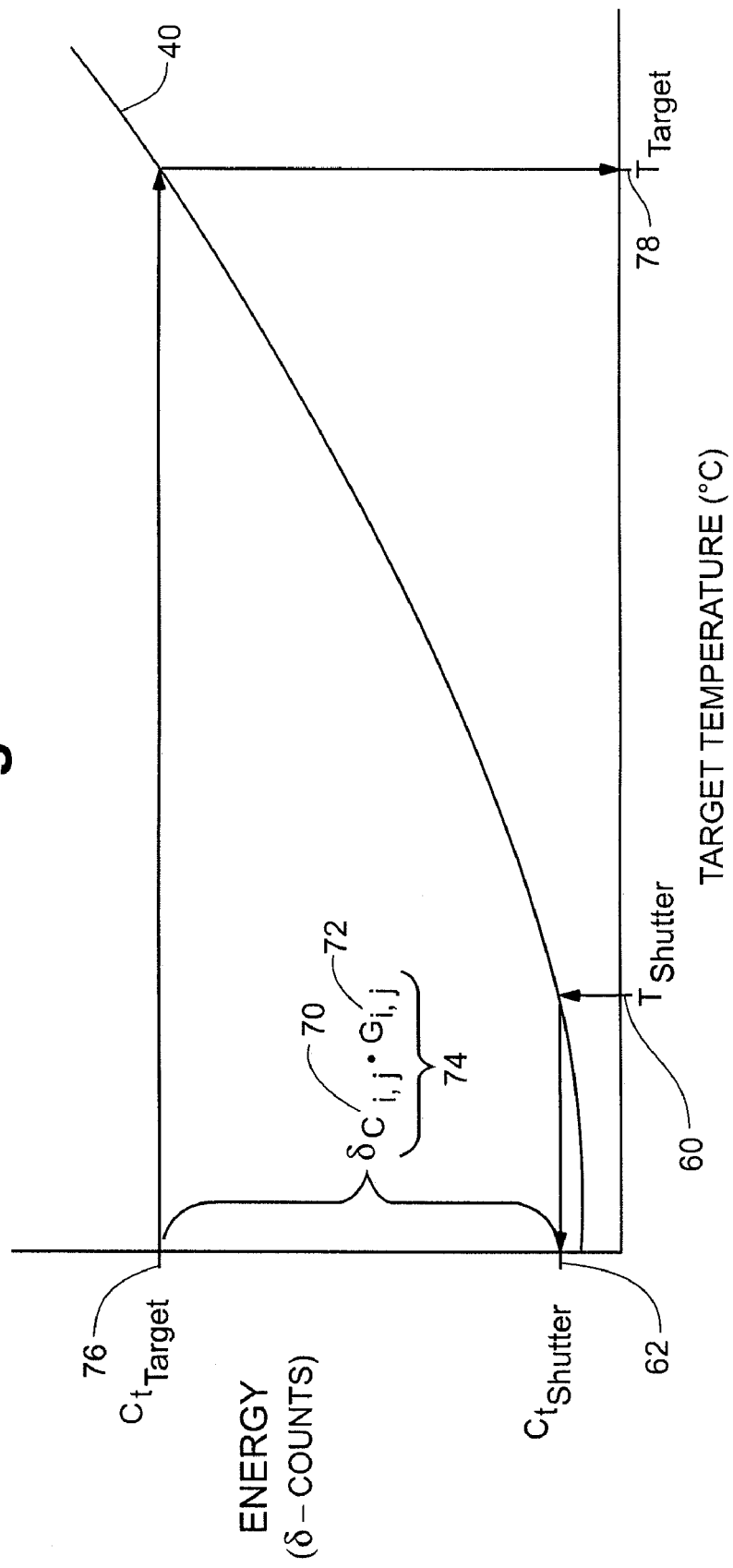
FIG. 4 is the calibration curve of FIG. 2 demonstrating how target scene temperature is calculated with reference to output of each detector element of the FPA, immediately after a shutter of the imaging system has been opened, in accordance with certain embodiments of the invention.

As described above, while FIG. 3 demonstrates how temperature of a target scene is calculated using the calibration curve 40 of FIG. 2 with respect to the reference detector element of the FPA 14, such process must be contemporaneously performed by the imager algorithm for every individual detector element of the FPA 14. FIG. 4 illustrates such expanded functionality with respect to the imager algorithm of the system 10. In particular, FIG. 4 illustrates the calibration curve of FIG. 2 demonstrating how temperature of a target scene is calculated, for example, with reference to output of each detector element of the FPA 14, immediately after the shutter 24 has been opened, in accordance with certain embodiments of the invention.

With reference to FIG. 1, and similar in manner to that exemplified above with respect to FIG. 3, the imager algorithm of the system 10 derives the output of the detector elements attributable to the target scene 18 relative to the reference output ($Ct_{Shutter}$). However, while FIG. 3 was exemplary with respect to the reference detector element, in the case of FIG. 4, all of the outputs of the detector elements of the FPA 14 are contemporaneously measured with the shutter 24 closed. Accordingly, a distinct output is measured for each detector element of the FPA 14. As described above, the detector elements are often arranged on the FPA 14 in a matrix format. As such, each detector element is herein referenced via "i" and "j" variables, e.g., with "i" representing the row in the FPA matrix in which a detector element is located and "j" representing the column in the FPA matrix in which the same detector element is located. Thus, with the imaging system being in the vicinity of a target scene 18, the shutter 24 is closed and an output of each of the detector elements of the FPA 14 is measured and stored.

Following measurement of the outputs of the detector elements when the shutter 24 is closed, the shutter 24 is opened. As should be appreciated, the system 10, or rather, the optics 12 of the system 10, would be directed at the target scene 18 soon after the shutter 24 is opened. In turn, a distinct output is measured for each detector element of the FPA 14. Following such measurements, the imager algorithm of the system 10 derives portions of the just-measured detector element outputs attributable to the target scene 18. Such derivation, similar to what was exemplified for the reference detector element with respect to FIG. 3, involves subtracting the stored outputs of the detector elements (measured when the shutter 24 was closed) from their respective outputs just measured with the shutter 24 open. Such output portions of the detector elements, collectively shown as $\delta c_{i,j}$ (referenced as 70), are the collective output of the FPA 14 attributable to the target scene 18.

As alluded to above, the detector elements of the FPA 14 have unique response characteristics. Put another way, each detector element of the FPA 14 has a unique gain component. The gain component for the reference detector element is generally considered to have a fundamental value of 1, while the gain components of the other detector elements of the FPA 14 may vary from such fundamental value. Gain components for each of the detector elements, collectively shown as $G_{i,j}$ (referenced as 72), can be calculated by the manufacturer for the imaging system 10 and stored in memory (e.g., of a processor) of the system 10 during the system's calibration. The calculation of such gain components ($G_{i,j}$) would be known to those skilled in the art. In turn, the imager algorithm retrieves these gain components ($G_{i,j}$) from memory and respectively multiplies them by the derived output portions of the detector elements ($\delta c_{i,j}$), resulting in products collectively shown as $\delta c_{i,j} \cdot G_{i,j}$ (referenced as 74).

Similar to that described above with reference to FIG. 3, in order to determine real-time outputs of the FPA detector elements attributable to the target scene 18, a reference output or offset is determined by the imager algorithm. As described above, in using a calibration curve (such as the curve of FIG. 2) in determining real-time temperatures of the target scene 18, a reference output is necessary to predict how the current temperature of the enclosure 22/shutter 24 compare to their temperature when such calibration curve was generated. As described above, in certain embodiments, the temperature of such system structures is based on the previously-measured temperature of the shutter 24.

With reference to FIG. 4, such shutter temperature ($T_{shutter}$, again referenced as 60), taken when the shutter 24 was most recently closed, is used by the imager algorithm of the system 10 with the curve 40 in determining a corresponding reference output of the reference detector element ($Ct_{Shutter}$, again referenced as 62). As described above, such reference output of the reference detector element ($Ct_{Shutter}$) represents the offset in output for the FPA reference detector element in light of the variance in temperature proximate to the FPA 14 from its generally maintained temperature during generation of the curve 40. In turn, the reference output of the reference detector element ($Ct_{Shutter}$) is the point on the y-axis from which each of the output portions of the detector elements attributable to the target scene, collectively shown as $\delta c_{i,j} \cdot G_{i,j}$, are projected. As described above, in certain embodiments, this output projection involves calculating the output portions of the FPA detector elements attributable to the target scene 18 (each being a distinct $Ct_{Target}$ value, referenced as 76) immediately after the shutter 24 is opened.

The following equation represents the output relationship described above, with reference to FIG. 4:

$$Ct_{Target} = Ct_{Shutter} + (\delta c_{i,j} \cdot G_{i,j}). \quad \text{(iii)}$$

From the above equation, it should be understood that $Ct_{Shutter}$ is used to compensate or offset each of the output portions of the detector elements for real-time temperatures of the enclosure 22/shutter 24. Accordingly, a reference or offset point is provided on the curve 40 from which outputs of the detector elements attributable to the target scene are projected (resulting in a distinct $Ct_{Target}$ value for each detector element). As described above, such output portions are derived relative to output measured immediately after a last (or most recent) activation of the shutter 24. In turn, the temperatures of the target scene 18 (each being a distinct $T_{Target}$ value, referenced as 78) with respect to each of the projected outputs (each $Ct_{Target}$ value) can be found on the x-axis by the imager algorithm of the system 10 via use of the curve 40.

It should be appreciated that the shutter 24 may be manually closed for certain events. For example, the infrared imaging system 10 may be moved to another area so as to view another target scene and/or the system 10 may be turned off. Accordingly, following such events, in certain embodiments, the imager algorithm is configured to keep the shutter 24 initially closed upon further use of the system 10. As such, when the shutter is initially closed, new outputs of the detector elements are measured and stored, thereby replacing the prior stored outputs. In turn, such newly measured and stored outputs are used by the imager algorithm in maintaining the image quality of the system 10 during further use of the imaging system 10.

As alluded to above, the embodied infrared imaging system 10 is configured to maintain image quality in presence of temperature drift for the system 10 without frequent actuation of the shutter 24. With reference to FIG. 1, such temperature drift of the system 10 is generally a reflection of how the temperature of the structures surrounding the FPA 14 varies or shifts over time, with such temperature variance known to adversely affect the output of the detector elements of the FPA 14. In particular, it has been found that a 1° C. change in temperature proximate to the FPA 14 can be seen by the FPA detector elements as almost a 10° C. change in scene temperature. As such, it is essential to account for such temperature variance proximate to the FPA 14 to ensure the outputs calculated from the FPA 14 are valid, particularly in the instant embodiments, when the shutter 24 is kept open for extended periods of time during use of the imaging system 10.

Accounting for such temperature variance, and its impact on the outputs of the FPA detector elements, is buoyed by the inclusion of the enclosure 22 within the imaging system 10. In particular, the temperature variance proximate to the FPA 14 is generally confined within the enclosure 22. Such confinement enables accurate accounting, and subsequent offsetting, of a drift component (attributable from the temperature variance) from the calculated outputs of the FPA detector elements over time. To that end, FIG. 5 shows the calibration curve 40 of FIG. 2 demonstrating how target scene temperature is calculated with reference to output of each detector element of the FPA with thermal drift accounted for in accordance with certain embodiments of the invention.

As described above, the detector elements of the FPA 14 are exposed to varied sources of infrared energy depending on whether the shutter 24 is in its closed position or its open position. In particular, when the shutter 24 is in its closed position, the detector elements of the FPA 14 are only exposed to infrared energy 34 emanating from the shutter 24 and the enclosure 22. Conversely, when the shutter 24 is in its open position, the detector elements of the FPA 14 are exposed to the infrared energy 16 emanating from the source 18 (via the outer and inner apertures 26, 28 of the enclosure 22), as well as the infrared energy 34 emanating from the enclosure 22 and the shutter 24.

Because the detector elements of the FPA 14 have unique response characteristics, each of the elements are uniquely affected by the infrared energy 34 emanating from the shutter 24 and the enclosure 22. Accordingly, each detector element of the FPA 14 has its own distinct drift component, collectively represented as $\Delta_{i,j}$ (and referenced as 80). As described above with respect to FIG. 4, the reference detector element output ($Ct_{Shutter}$) is derived from the shutter temperature ($T_{Shutter}$), and provides the offset for the detector element outputs ($\delta c_{i,j} \cdot G_{i,j}$). These two outputs (($Ct_{Shutter}$) and ($\delta c_{i,j} \cdot G_{i,j}$)) are then summed to determine the target temperatures ($T_{Target}$ values) using the curve 40. However, as further described above, this model only applies when determining target temperatures ($T_{Target}$ values) immediately after the shutter 24 is opened, where there is no drift component for the FPA detector elements. During continued use of the imaging system 10 (where the shutter 24 remains open for extended periods of time), the detector elements outputs ($\delta c_{i,j} \cdot G_{i,j}$) are generally found to be impacted by variances in temperature proximate to the FPA 14. As such, the imager algorithm uses a further model in determining the drift component $\Delta_{i,j}$ of each of the detector element outputs ($\delta c_{i,j} \cdot G_{i,j}$), as detailed below with reference to FIG. 5.

Figure 5:
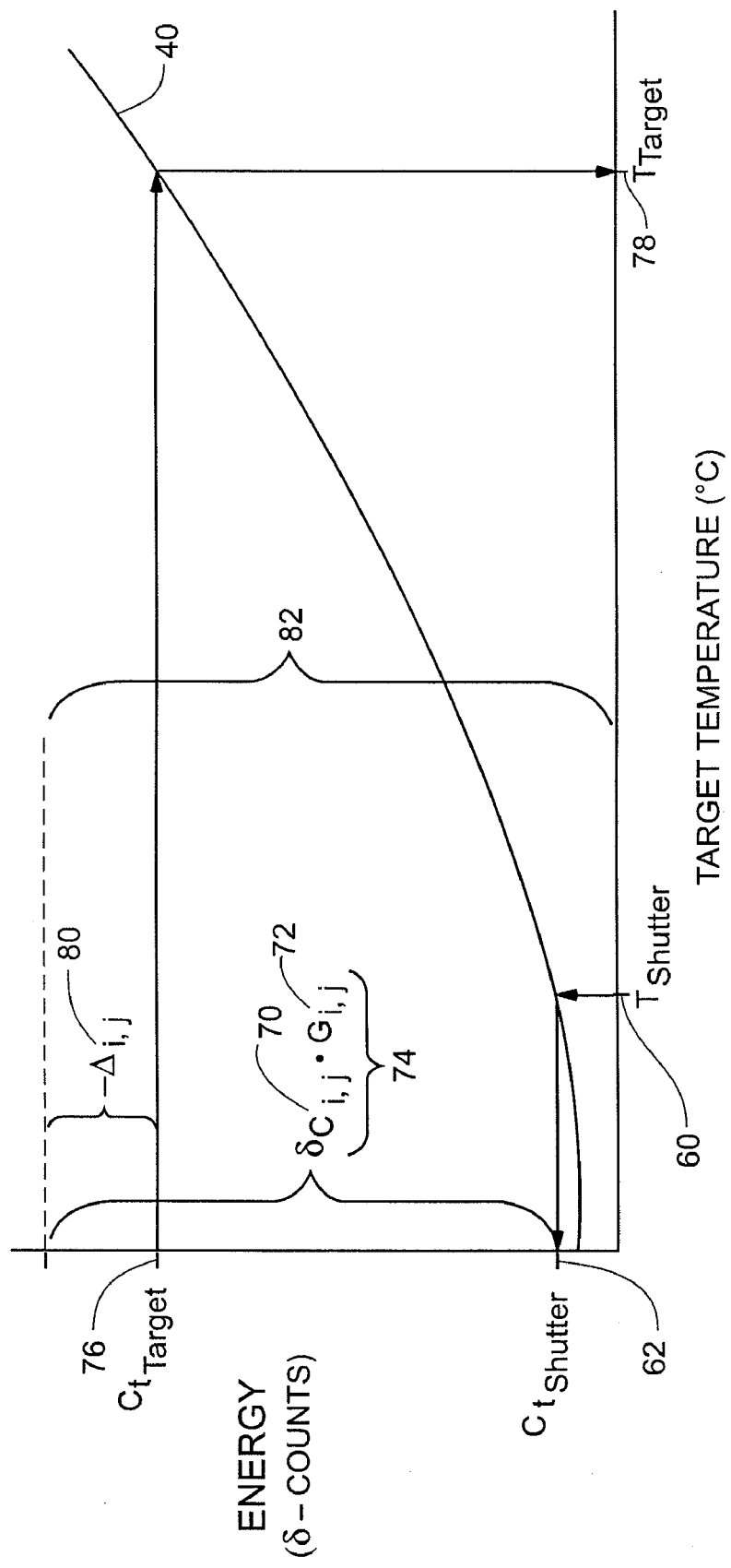
FIG. 5 is the calibration curve of FIG. 2 demonstrating how target scene temperature is calculated with reference to output of each detector element of the FPA with thermal drift accounted for in accordance with certain embodiments of the invention.

As can be gathered from FIG. 5, the imager algorithm performs certain steps which are similar to the steps described above with respect to FIG. 4 (i.e., performed immediately after the shutter 24 is opened). For example, with reference to curve 40 of FIG. 5, the imager algorithm initially uses (and continues to use for subsequent derivations while the shutter 24 is open) the temperature of the shutter 24 ($T_{Shutter}$, again referenced as 60). As described above, $T_{Shutter}$ is the temperature taken during the last (or most recent) closure of the shutter 24, and in certain embodiments, is attributed to the temperature of the enclosure 22, e.g., measured using the temperature sensor 36 operatively coupled to the enclosure 22. In turn, the shutter temperature ($T_{Shutter}$) is used with the curve 40 to determine the corresponding output offset for the FPA detector elements ($Ct_{Shutter}$, again referenced as 62).

The imager algorithm, in turn, measures the outputs of the detector elements ($\delta c_{i,j}$, again referenced as 70); retrieves the gain components for each of the detector elements ($G_{i,j}$, again referenced as 72) from memory and respectively multiplies the detector element outputs by the gain components, leading to ($\delta c_{i,j} \cdot G_{i,j}$) values (again referenced as 74); and adds these gain-corrected outputs ($\delta c_{i,j} \cdot G_{i,j}$) to the output offset for the FPA detector elements ($Ct_{Shutter}$), with these sums representing the corrected output for the detector elements (referenced as 82).

However, as described above, such corrected outputs 82 contain components not only of the scene 18, but also from any increase in infrared energy 34 (depicted in FIG. 1) emanating from the shutter 24 and enclosure 22. This additional energy 34 from the shutter 24 and enclosure 22 (collectively represented as $\Delta_{i,j}$) must be removed before using the curve 40 in determining the temperatures of the target scene 18 (each being a distinct $T_{Target}$ value, referenced as 78). The following equation represents the output relationship described above, with reference to FIG. 5:

$$Ct_{Target} = Ct_{Shutter} + (\delta c_{i,j} \cdot G_{i,j}) - \Delta_{i,j}. \quad \text{(iv)}$$

It should be appreciated that during an initial image maintenance iteration by the imager algorithm (immediately after the most recent closure of the shutter 24), as depicted in FIG. 4, there is no need to account for drift because the temperature of the shutter 24 has not changed. However, with every subsequent image maintenance iteration (as exemplarily depicted in FIG. 5), drift components ($\Delta_{i,j}$) need to be accounted for because the temperature of the shutter 24 may have changed. Thus, using a calibration curve (such as the curve of FIG. 5) in determining target scene temperatures (each $T_{Target}$ value) for each FPA detector element, one is able to further determine and subsequently remove the corresponding drift component ($\Delta_{i,j}$) from each determined output of the elements ($\delta c_{i,j} \cdot G_{i,j}$).

The drift components ($\Delta_{i,j}$) are largely based on a difference in measurements taken by the imager algorithm between when the shutter 24 was last closed and a current state with the shutter 24 open. In certain embodiments, the derivation of the drift components ($\Delta_{i,j}$) involves use of the temperatures of the enclosure 22 when the shutter 24 was last closed ($T_{Shutter\ (last\ taken\ (with\ shutter\ closed))}$) and in the present when the shutter 24 is open ($T_{Shutter\ (present\ (with\ shutter\ open))}$). In turn, the respective outputs corresponding to these enclosure temperatures (each obtained by using the curve 40) are used in calculating the drift components ($\Delta_{i,j}$). In certain embodiments, the calculation of the drift components ($\Delta_{i,j}$) further involves use of a drift coefficient, $D_{Shutter\ i,j}$, with the following equation being used:

$$\Delta_{i,j} = D_{Shutter\ i,j} \cdot [Ct_{Shutter(present(with\ shutter\ open))} - Ct_{Shutter(last\ taken(with\ shutter\ closed))}] \quad \text{(v)}$$

where $D_{Shutter\ i,j}$ is an array of calibration constraints (one for detector element) which correct for drift.

The drift coefficients ($D_{Shutter\ i,j}$) are generally calculated at time of calibration and stored in memory of the imaging system 10. Calculating for the drift coefficients ($D_{Shutter\ i,j}$) involves taking measurements from the imaging system 10 at a time "0", immediately after the shutter 24 is opened (i.e., so there is no drift component ($\Delta_{i,j}$)) and a later time (i.e., time "1") with the shutter 24 still open but with variance to the temperature of the enclosure 22/shutter 24 from time "0" (i.e., so there is now a drift component ($\Delta_{i,j}$)). As should be appreciated, such variance to the enclosure/shutter temperature impacts the outputs from the FPA detector elements taken at time "1". As should be appreciated, such points in time ("0" and "1" times) have already been described above with respect to FIGS. 4 and 5 above, and further, with respect to equations (iii) and (iv), respectively. Keeping the target scene temperatures (each $T_{Target}$ value) for each FPA detector element the same during these points in time (time "0" and the later time), the corresponding $Ct_{Target}$ values would be kept the same. Accordingly, equations (iii) and (iv) can be provided so as to be equal to one another, as shown below:

$$Ct_{Shutter\_0} + ((\delta c_{i,j})_0 \cdot G_{i,j}) = Ct_{Shutter\_0} + ((\delta c_{i,j})_1 \cdot G_{i,j}) - \Delta_{i,j}. \quad \text{(vi)}$$

In turn, using equation (v) above, the drift component ($\Delta_{i,j}$) can be replaced in equation (vi), resulting in:

$$Ct_{Shutter\_0} + ((\delta c_{i,j})_0 \cdot G_{i,j}) = Ct_{Shutter\_0} + ((\delta c_{i,j})_1 \cdot G_{i,j}) - D_{Shutter\ i,j} \cdot [Ct_{Shutter\_1} - Ct_{Shutter\_0}], \quad \text{(vii)}$$

which can be reconfigured to solve for the drift coefficients ($D_{Shutter\ i,j}$), resulting in the following equation:

$$D_{Shutter\ i,j} = [G_{i,j} \cdot [(\delta C_{i,j})_1 - (\delta c_{i,j})_0]]/[Ct_{Shutter\_2} - Ct_{Shutter\_0}]. \quad \text{(viii)}$$

With the drift coefficients ($D_{Shutter\ i,j}$) previously calculated and stored in memory of the imager system 10, the imager algorithm can calculate the drift components ($\Delta_{i,j}$) using equation (v). Such drift component can be used by the imager algorithm in deriving output portions for each of the FPA detector elements attributable to the target scene ($Ct_{Target}$ values), using equation (iv) above. In turn, the imager algorithm uses these outputs ($Ct_{Target}$ values) with the curve 40 in determining the corresponding target scene temperatures ($T_{Target}$ values). It should be appreciated that the above model provides good image quality for the imaging system 10 without the need to flag, or close the shutter 24, even in the presence of significant swings in temperature with respect to the enclosure 22/shutter 24.

Figure 6:
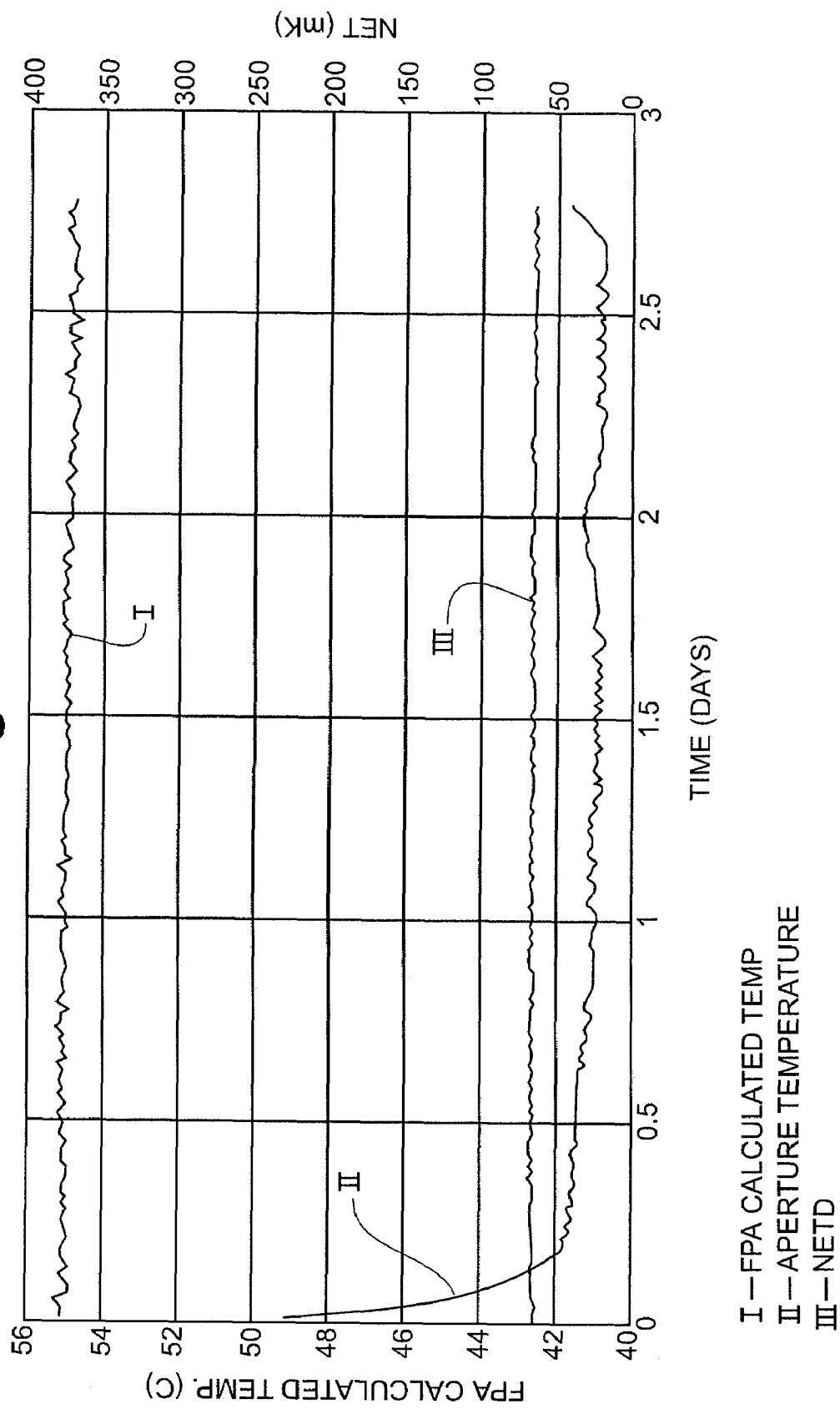
FIG. 6 is an exemplary plot depicting temperature calculation accuracy of the imaging system of FIG. 1 over time without shutter closure in accordance with certain embodiments of the invention.
Figure 7:
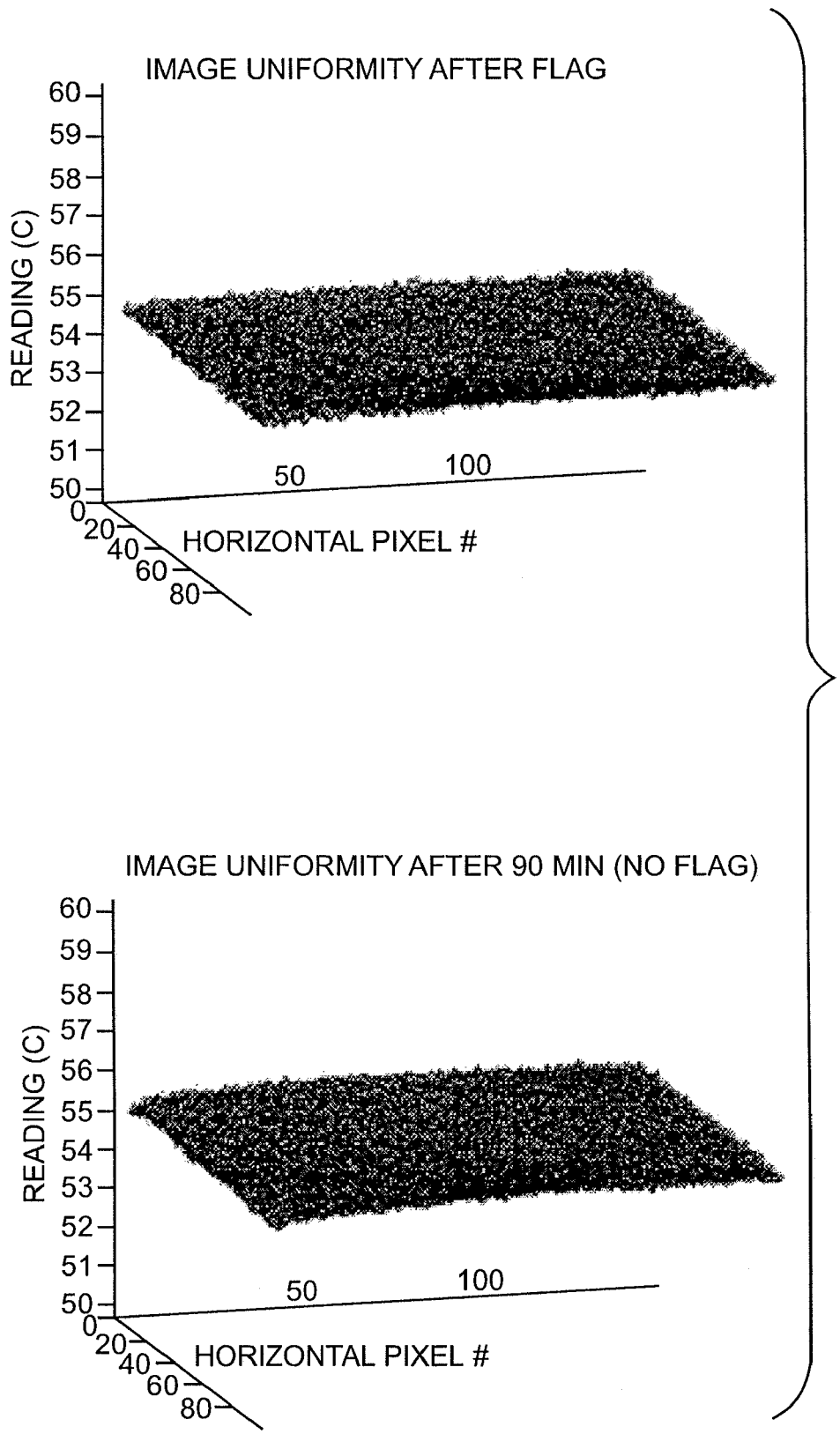
FIG. 7 are further exemplary plots depicting image quality of the imaging system of FIG. 1 over time without shutter closure in accordance with certain embodiments of the invention.

FIGS. 6 and 7 help illustrate the above-noted excellent image quality that can be maintained without closing the shutter 24 of the imaging system 10 by using the imager algorithm. FIG. 6 is a plot of three different lines, where line I represents the calculated target temperature over time, line II represents the measured temperature of the enclosure 22 over time, and line III represents the Noise Equivalent Temperature Difference (NETD) over time. As illustrated, the time line on the x-axis shows the test duration being almost three days over which the imager system 10 was used without closing the shutter 24. The target temperature was kept at a constant temperature of 55° C. over the test duration. As can be seen, the calculated target temperature (line I) exhibited no significant change in temperature (from 55° C.) over the test duration, while the measured temperature of the enclosure 22 (line II) showed dramatic change in temperature (due to the imaging system cooling down, going from about 49° C. to about 41° C.) over the same period. In addition, the calculated target temperature (line I) showed negligible noise equivalent temperature difference over the same period. Accordingly, accuracy and noise quality remained excellent, even with the shutter 24 not being closed over the test duration.

FIG. 7 further illustrates the above superior performance of the imager algorithm when used with the imaging system 10. As shown, two graphs depicting image uniformity for the FPA 14 are shown side by side, the graph on the left showing the uniformity immediately after opening the shutter 24 and the graph on the right showing the uniformity after 90 minutes without further closing the shutter 24. Similar to that described above with respect to FIG. 6, the target temperature was kept at a constant temperature of 55° C. over the test duration. In comparing the two plots, there is no noticeable difference between the two even though the unit started cooling down from a 50° C. shortly after the shutter 24 was opened. Accordingly, image quality was maintained through use of the imager algorithm.

It will be appreciated the embodiments of the present invention can take many forms, and it is not intended that the embodiments of the invention presented herein should limit the scope thereof.

What is claimed is:

1. A method of maintaining image quality in presence of temperature drift for an infrared (IR) imaging system comprising:
   a) taking base measurements from the IR imaging system while a shutter of the IR imaging system is closed, the base measurements comprising temperature with regard to the shutter and outputs of detector elements of a focal plane array (FPA) of the IR imaging system;
   b) determining an offset output for the IR imaging system from the base temperature with regard to the shutter;
   c) taking present measurements from the IR imaging system while the shutter is open and the IR imaging system is directed at a target scene, the present measurements comprising temperature with regard to the shutter and outputs of the FPA detector elements;
   d) calculating thermal drift components with regard to the present outputs of the FPA detector elements in light of differences between the base and present measurements;
   e) calculating outputs of the FPA detector elements attributable to the target scene in light of the present outputs of the FPA detector elements, the respective drift components of the FPA detector elements, and the offset output;
   f) determining temperatures of the target scene from the output portions of the FPA detector elements attributable to the target scene; and
   g) repeating steps (c) through (f) while the shutter is open during continued use of the IR imaging system.

2. The method of claim 1, wherein the base and present outputs of the FPA detector elements are converted into a digital format prior to being measured.

3. The method of claim 2, wherein the base and present outputs of the FPA detector elements are converted into digital counts, wherein quantity of digital counts measured corresponds to thermal intensity borne on the FPA detector elements.

4. The method of claim 1, wherein the offset output is derived from the base temperature measured with regard to the shutter using the calibration curve.

5. The method of claim 1, wherein a calibration curve is used with the IR imaging system in one or more of calculating the thermal drift components, calculating the output portions of the FPA detector elements attributable to the target scene, and determining the target scene temperatures, wherein the calibration curve depicts averaged output of one or more detector elements of the FPA for different temperatures of the target scene.

6. The method of claim 5, wherein the base and present temperatures measured with regard to the shutter correspond to outputs from the calibration curve, wherein the thermal drift component for each FPA detector element is based on a difference between such corresponding outputs, with such difference being multiplied by a respective drift coefficient for each FPA detector element.

7. The method of claim 5, wherein the output portions of the FPA detector elements attributable to the target scene are derived by respectively subtracting the base outputs from the present outputs of each of the FPA detector elements and multiplying result by a respective gain for each of the FPA detector elements, and further respectively subtracting the drift components of the FPA detector elements therefrom and adding the offset output thereto.

8. The method of claim 5, wherein the target scene temperatures are respectively derived from the output portions of the FPA detector elements using the calibration curve.

9. The method of claim 5, wherein the calibration curve is retrieved from memory of the IR imaging system, the memory being part of a processor in an electronic circuit of the IR imaging system.

10. The method of claim 1, wherein the shutter is in thermal communication with an enclosure of the IR imaging system, wherein the enclosure is disposed between the FPA and the target scene whereby IR energies from the target scene are directed there through and onto the FPA when the shutter is open and IR energies from the target scene are blocked from the FPA when the shutter is closed, wherein the base and present temperatures measured with regard to the shutter each comprises a temperature measurement of the enclosure.

11. The method of claim 10, wherein the enclosure is formed of one or more isothermal materials, wherein the enclosure temperature is measured via a single thermal sensor affixed to the enclosure.

12. An infrared (IR) imaging apparatus comprising:
a lens for focusing IR energy from a target scene;
a focal plane array (FPA) paired with the lens and adapted to receive the IR energy from the target scene via the lens, the FPA comprising a plurality of IR detector elements;
means for selectively exposing the FPA detector elements to the IR energy from the target scene, the means enabling maintenance of image quality in presence of temperature drift for the IR imaging apparatus following a single blocking of the FPA detector elements from the IR energy from the target scene; and
a processor operatively coupled to the FPA and configured for making initial measurements of the IR imaging apparatus during the single blocking of the FPA detector elements and for making continued measurements of the IR imaging apparatus during continued use of the IR imaging apparatus when the FPA detector elements are exposed to the IR energy from the target scene, the processor configured for storing the initial measurements and configured for using a calibration curve for the IR imaging apparatus with which the initial and continued measurements are used in maintaining image quality in presence of temperature drift during the continued use of the IR imaging apparatus.

13. The apparatus of claim 12, wherein the calibration curve is a graph depicting averaged output of one or more detector elements of the FPA for different temperatures of the target scene, wherein the calibration curve is stored in memory of the processor.

14. The apparatus of claim 13, wherein the initial measurements comprise a base temperature of the means and base outputs of the FPA detector elements, and wherein the continued measurements comprise a present temperature of the means and present outputs of the FPA detector elements.

15. The apparatus of claim 14, wherein the base and present temperatures of the means correspond to outputs on the calibration curve, wherein thermal drift components for each of the FPA detector elements are based on a difference between such corresponding outputs, with the thermal drift components comprising a multiplication of the difference by a respective drift coefficient for each FPA detector element.

16. The apparatus of claim 14, wherein output portions of the FPA detector elements attributable to the target scene derive respectively from a difference of the base outputs from the present outputs of each of the FPA detector elements and a multiplication of result by a respective gain for each of the FPA detector elements, and further respectively a subtraction of the drift components of the FPA detector elements therefrom and addition of an offset output thereto.

17. The apparatus of claim 16, wherein the offset output comprises an output on the calibration curve which corresponds to the base temperature of the means.

18. The apparatus of claim 16, wherein temperatures of the target scene correspond to outputs portions on the calibration curve.

19. The apparatus of claim 12, wherein the means comprise a shutter and an enclosure, wherein the enclosure is disposed between the FPA and the target scene, wherein the enclosure enables IR energies from the target scene to be directed there through and onto the FPA when the shutter is open, and wherein the infrared energies from the target scene are blocked from being directed onto the FPA when the shutter is closed.

20. The apparatus of claim 19, wherein the enclosure comprises apertures enabling the infrared energies to pass there through and onto the FPA, at least one of the apertures covered when the shutter is closed and both of the apertures uncovered when the shutter is open.

21. The apparatus of claim 19, wherein the shutter is in thermal communication with the enclosure, wherein the initial and continued measurements each comprises a temperature measurement of the enclosure.

22. A computer-readable medium programmed with instructions for maintaining image quality in presence of temperature drift for an infrared (IR) imaging system, the medium comprising instructions for causing a programmable processor to:
a) take base measurements from the IR imaging system while a shutter of the IR imaging system is closed, the base measurements comprising temperature with regard to the shutter and outputs of detector elements of a focal plane array (FPA) of the IR imaging system;
b) determine an offset output for the IR imaging system from the base temperature with regard to the shutter;
c) take present measurements from the IR imaging system while the shutter is open and the IR imaging system is directed at a target scene, the present measurements comprising temperature with regard to the shutter and outputs of the FPA detector elements;
d) calculate thermal drift components with regard to the present outputs of the FPA detector elements in light of differences between the base and present measurements;
e) calculating outputs of the FPA detector elements attributable to the target scene in light of the present outputs of the FPA detector elements, the respective drift components of the FPA detector elements, and the offset output;
f) determine temperatures of the target scene from the output portions of the FPA detector elements attributable to the target scene; and
g) repeat steps (c) through (f) while the shutter is open during continued use of the IR imaging system.

23. The computer-readable medium of claim 22, wherein the offset output is derived from the base temperature measured with regard to the shutter using the calibration curve.

24. The computer-readable medium of claim 22, wherein a calibration curve is used with the IR imaging system in one or more of calculating the thermal drift components, calculating the output portions of the FPA detector elements attributable to the target scene, and determining the target scene temperatures, wherein the calibration curve depicts averaged output of one or more detector elements of the FPA for different temperatures of the target scene.

25. The computer-readable medium of claim 24, wherein the base and present temperatures measured with regard to the shutter correspond to outputs from the calibration curve, wherein the thermal drift component for each FPA detector element is based on a difference between such corresponding outputs, with such difference being multiplied by a respective drift coefficient for each FPA detector element.

26. The computer-readable medium of claim 24, wherein the output portions of the FPA detector elements attributable to the target scene are derived by respectively subtracting the base outputs from the present outputs of each of the FPA detector elements and multiplying result by a respective gain for each of the FPA detector elements, and further respectively subtracting the drift components of the FPA detector elements therefrom and adding the offset output thereto.

27. The computer-readable medium of claim 24, wherein the target scene temperatures are respectively derived from the output portions of the FPA detector elements using the calibration curve.

28. The computer-readable medium of claim 24, wherein the shutter is in thermal communication with an enclosure of the IR imaging system, wherein the enclosure is disposed between the FPA and the target scene whereby IR energies from the target scene are directed there through and onto the FPA when the shutter is open and IR energies from the target scene are blocked from the FPA when the shutter is closed, wherein the base and present temperatures measured with regard to the shutter each comprises a temperature measurement of the enclosure.

* * * * *